Oct. 19, 1943.　　G. B. ARNOLD ET AL　　2,332,189

GASEOUS DISCHARGE DEVICE

Filed Aug. 26, 1941

LEON DONN
GEORGE B. ARNOLD
　　　　INVENTORS

BY　R. J. Dearborn
　　Daniel Stryker
　　　　THEIR ATTORNEYS

Patented Oct. 19, 1943

2,332,189

UNITED STATES PATENT OFFICE 2,332,189

GASEOUS DISCHARGE DEVICE

George B. Arnold and Leon Donn, Beacon, N. Y., assignors, by mesne assignments, to The Texas Company, New York, N. Y., a corporation of Delaware Application August 26, 1941, Serial No. 408,316

7 Claims. (Cl. 176—122)

This invention relates to gaseous discharge devices and particularly to a hydrogen discharge tube for use in the accurate measurement of dispersion. The principal purposes of the invention are to provide a device by means of which a spot of intense light may be obtained and maintained, for a considerable time without failure due to overheating and with the use of a relatively low high voltage current source.

In the measurement of the index of refraction in connection with the analysis of substances such as, for instance, toluene, various types of refractometers have been used. Some of these which are sufficiently sensitive to permit the use of a less intense source of light are very expensive and some are not now available. In order to be able to use other forms of refractometers, such as the Abbe type, sources of very intense light are required in order to operate without a lens system. The available devices for producing such light usually fail from overheating after a few minutes operation. In some of these discharge tubes the electrodes are too close together and in others, one or both of the electrodes are disposed too close to glass elements within the tube and over-heating of the glass is thus caused. Other tubes which will provide good light over a reasonably long period are very expensive and require a high current source.

In accordance with the present invention a gaseous discharge tube of the hydrogen type has been provided and in this device two aluminum electrodes are mounted at opposite ends within a glass housing or envelope of any convenient shape. A glass capillary tube through which the discharge takes place is disposed on the axis of one of the electrodes which is cylindrical in shape and considerably larger in diameter than the capillary tube. In this manner the electrodes are separated not only from each other but from the glass element within the tube, and it has been found that tubes embodying this invention can be used continuously for as long as thirty minutes without any over-heating.

For a better understanding of the invention reference may be had to the accompanying drawing in which.

Figure 1:
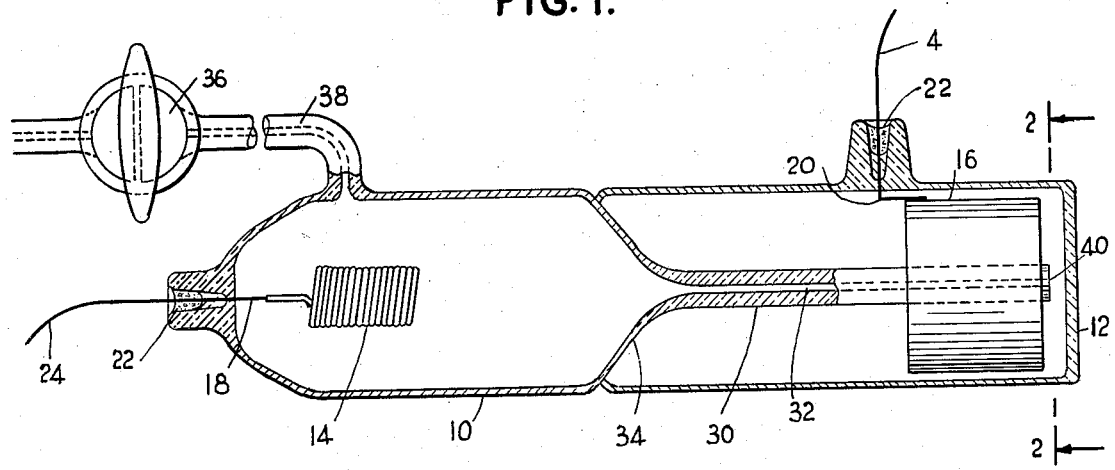
Fig. 1 is a vertical longitudinal section through a discharge tube embodying the invention.
Figure 3:
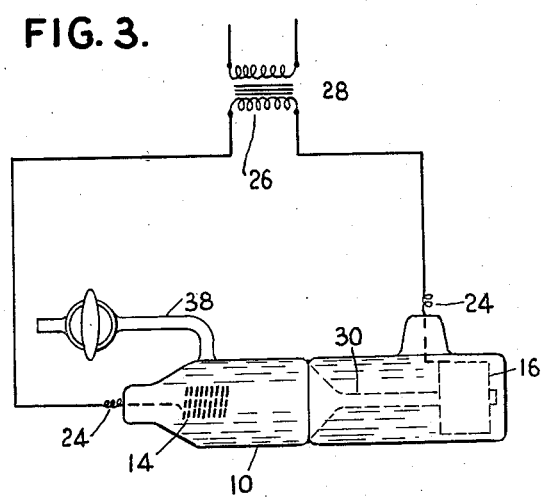
Fig. 3 is a schematic diagram showing the electrodes connected to the secondary of a high voltage transformer.
Figure 2:
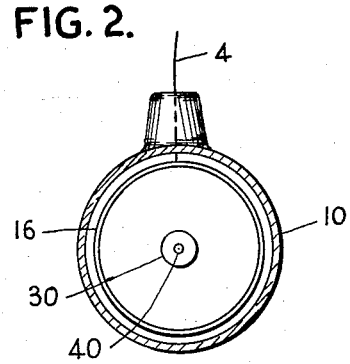
Fig. 2 is a section taken on the line 2—2 of Fig. 1.

Referring to the drawing, a glass housing or envelope 10 is provided, this housing being shown as substantially cylindrical in shape and closed at both ends. The end 12 of the housing where the light is formed is preferably flat and it is through this surface that the light spot may be viewed. A pair of electrodes 14 and 16 are supported within the housing by means of tungsten wires 18 and 20, respectively, these supporting wires being sealed in the wall of the housing and the seal may be protected as by means of cement 22. Flexible external leads 24 connected to the tungsten wires are adapted to be connected in turn to the secondary 26 of a suitable high voltage transformer 28 which serves as a source of potential. The electrode 14 is preferably formed of a coil of aluminum wire and the electrode 16 is formed of a sheet of aluminum in the shape of a cylinder, the axis of the cylindrical electrode substantially coinciding with the longitudinal axis of the housing 10.

A glass tube 30 having an opening 32 of capillary dimensions, preferably between .5 mm. and 2 mm. in diameter, is provided with a flaring or conical flange 34, this flange being attached to the walls of the housing 10 so as to form a partition which is substantially the mid-point of the housing. It is understood that for construction purposes the tube 30, the flange 34 and one section of the housing 10 may be formed in one piece, as is shown in Fig. 1, the other section of the housing then being attached to the first section opposite the flanged partition 34. The tube 30 extends to and preferably through the cylindrical electrode 16, the axis of the tube coinciding with the axis of the cylindrical electrode and with the longitudinal axis of the housing 10. The opening 32 is preferably in alignment with the electrode 14. A stop-cock 36 is mounted in a tube 38 communicating with the interior of the housing 10, and through the tube 38 the discharge device can be evacuated and then filled with hydrogen as often as necessary.

The tube is filled with moist electrolytic hydrogen under a pressure preferably of from .5 mm. to 8.0 mm. and may be refilled when necessary. It has been found that for the most satisfactory light a pressure of 3 to 4 mm. is needed.

In operation, the transformer 28 is energized to provide a potential of substantially 5,000 volts across the electrodes 14 and 16 at a current of about 30 milliamperes and the discharge takes place from one electrode, for example, 14 through the capillary opening 32 to the other electrode 16. When the device is viewed through the end 12 of the housing the end 40 of the capillary opening appears as a very brilliant round spot of light. This light is sufficiently intense to enable the device to be used with a refractometer of the Abbe type without a condensing lens.

It has been found that a discharge tube as described can be operated for as long as thirty minutes without the capillary becoming sufficiently hot to give off a sodium light provided the tube is refilled with moist hydrogen from time to time. This is due to the fact that the electrodes are separated several inches. Each electrode is placed at an end of the tube so that the heat may be easily dissipated and far enough from the capillary tube 32 that the latter does not become too hot.

Although glass has been mentioned as the material for the envelope 10 and tube 30, it is preferred that Pyrex glass or fused quartz be used. Light of sufficient intensity to use with a refractometer of the Abbe type, for instance, is produced with a relatively small high voltage current source, thus making the tube a safer laboratory device. It has been found that these tubes can be constructed in as little time, as from four to five hours, by a competent glass blower. The materials used are inexpensive and a tube can therefore be made for a very small cost. The tube can be refilled at convenience from any laboratory supply of electrolytic hydrogen.

Obviously many modifications and variations of the invention, as hereinbefore set forth, may be made without departing from the spirit and scope thereof, and therefore, only such limitations should be imposed as are indicated in the appended claims.

We claim:

1. A gaseous discharge tube comprising an elongated closed housing of glass or the like, an electrode mounted within one end of said housing, a cylindrical electrode supported within the other end of said housing, a transverse non-metallic partition in said housing provided near its center with a capillary opening between .5 and 2 mm. in diameter, and a tubular member extending from said opening to said cylindrical electrode, the axes of said tubular member and of said cylindrical electrode substantially coinciding with the longitudinal axis of said housing.

2. A gaseous discharge tube comprising an elongated glass housing, an electrode mounted within one end of said housing, a cylindrical electrode supported within the other end of said housing, a tubular member having a capillary opening therethrough of the order of .5 to 2 mm. in diameter and extending from a point at about the center of the housing through and coaxially with said cylindrical electrode, and means for directing discharge from said first mentioned electrode into the nearer end of said tubular member, the axes of said tubular member, said cylindrical electrode and said housing substantially coinciding.

3. A hydrogen discharge tube comprising a glass housing substantially cylindrical in shape, an electrode mounted within one end of said housing, a cylindrical electrode supported within the other end of said housing, the axis of said cylindrical electrode substantially coinciding with the longitudinal axis of said housing, leads extending from said electrodes outwardly of said housing, and a tubular glass member having an opening of capillary dimensions and provided with a flaring, funnel-shaped end, said flaring end joining said housing so as to form a substantially lateral partition at substantially the midpoint of the housing and the tubular member extending through and coaxially with said cylindrical electrode.

4. A gaseous discharge tube comprising an elongated glass housing substantially cylindrical in shape, an electrode mounted within one end of said housing, a cylindrical electrode supported within the other end of said housing, the axis of said cylindrical electrode substantially coinciding with the longitudinal axis of said housing, a tubular glass member having an opening of capillary dimensions and provided with a flaring, funnel-shaped end, said flaring end being joined to said housing so as to form a substantially lateral partition at a point near the mid-section of the housing, the tubular member extending through and coaxially with said cylindrical electrode, and a valved tube connected to said housing through which gas may be evacuated from or passed into said tube.

5. A hydrogen discharge tube comprising an elongated glass housing, an electrode mounted within one end of said housing, said electrode being formed of a coil of aluminum wire, a cylindrical aluminum electrode supported within the opposite end of said housing, leads extending from said electrodes outwardly of said housing, a tubular member having an opening of capillary dimensions and provided with a flaring end, said flaring end being attached to the inner wall of said housing so as to form a substantially transverse partition and the tubular member extending through said cylindrical electrode, the axes of said electrodes and said tubular member coinciding with the longitudinal axis of said housing.

6. A gaseous discharge device comprising a closed, elongated, transparent envelope substantially cylindrical in shape, an electrode formed of a coil of aluminum wire mounted within one end of said envelope, a cylindrical aluminum electrode supported within the other end of said envelope, leads extending from said electrodes outwardly of said envelope, a discharge tube having an axial opening of capillary size and extending from a point near the center of said envelope through and to a point beyond said cylindrical electrode opposite said first mentioned electrode, the inner end of said tube having an outwardly flaring flange joined to the inner surface of said envelope at approximately the midpoint of the envelope to constitute a substantially transverse partition, the opening through said tube being in alignment with said first mentioned electrode and coinciding with the axis of said cylindrical electrode.

7. A gaseous discharge device comprising a closed, elongated, transparent envelope substantially cylindrical in shape, an electrode mounted within one end of said envelope, a cylindrical electrode supported within the other end of said envelope, leads extending from said electrodes outwardly of said envelope, a discharge tube having an axial opening of capillary size and extending from a point near the center of said envelope through and to a point beyond said cylindrical electrode opposite said first mentioned electrode, means for directing discharge from the first mentioned electrode to and into said capillary opening comprising a flaring, funnel-shaped, non-metallic flange attached to the inner end of said discharge tube and opening toward said first electrode, the opening through said tube being in alignment with said first mentioned electrode and coinciding with the axis of said cylindrical electrode.

GEORGE B. ARNOLD.
LEON DONN.